(12) United States Patent
Cho et al.

(10) Patent No.: US 8,233,143 B2
(45) Date of Patent: Jul. 31, 2012

(54) THREE DIMENSIONAL IMAGE SENSOR

(75) Inventors: Kyoung Lae Cho, Yongin-si (KR); Seung Hoon Lee, Seoul (KR); Dong Ki Min, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 12/587,988

(22) Filed: Oct. 15, 2009

(65) Prior Publication Data

US 2010/0303299 A1    Dec. 2, 2010

(30) Foreign Application Priority Data

May 29, 2009    (KR) .................. 10-2009-0047416

(51) Int. Cl.
*G01C 3/00*    (2006.01)
(52) U.S. Cl. .......................................................... 356/3
(58) Field of Classification Search .................. None
See application file for complete search history.

(56) References Cited

U.S. PATENT DOCUMENTS

| | | | |
|---|---|---|---|
| 5,739,901 A * | 4/1998 | Fujioka et al. ............... 356/5.01 |
| 5,892,575 A | 4/1999 | Marino ........................ 356/5.01 |
| 6,906,793 B2 | 6/2005 | Bamji et al. ................ 356/141.1 |
| 6,919,549 B2 | 7/2005 | Bamji et al. ................ 250/208.1 |
| 7,362,419 B2 | 4/2008 | Kurihara ...................... 356/4.07 |
| 2006/0192938 A1 | 8/2006 | Kawahito |
| 2008/0100822 A1* | 5/2008 | Munro ......................... 356/4.01 |

OTHER PUBLICATIONS

Korean Patent Application No. 1020067006103 to Fumikazu et al., having Publication date of May 23, 2006 (w/ English Abstract page).
Japanese Patent Application No. 2004-272001 to Fumikazu et al., having Publication date of Mar. 30, 2006 (w/ English Abstract page).
"CCD-Based Range-Finder Sensor" to Ryohei Miyagawa, IEEE Transactions on Electronic Devices, vol. 44, No. 10, Oct. 1997.

* cited by examiner

*Primary Examiner* — Tu Nguyen
(74) *Attorney, Agent, or Firm* — Monica H. Choi (57) ABSTRACT

A depth sensor includes a light source, a detector, and a signal processor. The light source transmits a source signal to the target according to a transmit control signal having reference time points. The detector receives a reflected signal from the source signal being reflected from the target. The signal processor generates a plurality of sensed values by measuring respective portions of the reflected signal during respective time periods with different time delays from the reference time points. The signal processor determines a respective delay time for a maximum/minimum of the sensed values for determining the distance of the target.

22 Claims, 10 Drawing Sheets

THREE DIMENSIONAL IMAGE SENSOR

CROSS-REFERENCE TO RELATED APPLICATION(S)

The present application claims priority under 35 U.S.C. §119 to Korean Patent Application No. 10-2009-0047416, filed on May 29, 2009, which is incorporated herein by reference in its entirety.

TECHNICAL FIELD

The present invention relates generally to image sensors, and more particularly, to a three dimensional (i.e., depth) image sensor for measuring a distance from an image target.

BACKGROUND

In image sensors, three dimensional information of an image is desired to be determined. For example, respective distances to points of a target are determined for forming a three dimensional image of the target or for other three dimensional image processing.

Such three dimensional information may be used for three dimensional shape measurement of the target. In the prior art, light is transmitted to the target, and one of triangulation, interferometry, or time of flight is used with light reflected from the target for determining the distances to points of the target.

In any case, a mechanism for accurately and efficiently determining the distances to points of the target is desired.

SUMMARY OF THE INVENTION

Accordingly, in a general aspect of the present invention, a rate of change of measured reflected light is used for accurately and efficiently determining the distance to a target.

In a general embodiment of the present invention, a depth sensor includes a light source, a detector, and a signal processor. The light source transmits a source signal to the target according to a transmit control signal having reference time points. The detector receives a reflected signal generated from the source signal being reflected from the target. The signal processor generates a plurality of sensed values by measuring respective portions of the reflected signal during respective time periods with different time delays from the reference time points.

In another embodiment of the present invention, the depth sensor further includes a controller for generating the control signal with the reference time points having at least one of substantially same values and/or substantially same phases of the transmit control signal.

In a further embodiment of the present invention, the signal processor determines the distance from the target from a rate of change of the sensed values.

For example, the signal processor determines a respective delay time for when the rate of change of the sensed values changes in direction. In that case, the signal processor determines the distance of the target by multiplying a speed of light with the respective delay time.

In another embodiment of the present invention, the reference time points are at periodic points of the transmit control signal. For example, the transmit control signal includes a series of pulses indicating turn on and turn off of the light source for generating the source signal.

In a further embodiment of the present invention, the light source generates pulses of light or modulated light when turned on by the transmit control signal.

In another embodiment of the present invention, the different time delays from the respective reference time points are gradually increased or decreased by a same increment with time or by different increments with time.

In a further embodiment of the present invention, a mean value or accumulated value of the sensed values is gradually increased or decreased by a same increment with time or by different increments with time.

In another general embodiment of the present invention, a depth sensor includes a light source, a detector, and a signal processor for determining a distance from a target according to when a rate of change of sensed values varies. The light source transmits a source signal to the target. The detector receives a reflected signal generated from the source signal being reflected from the target. The signal processor generates the sensed values by measuring respective portions of the reflected signal, and determines the distance from the target according to when the rate of change of the sensed values varies.

In an embodiment of the present invention, the signal processor determines a time of flight corresponding to a maximum or a minimum of the sensed values. In that case, the signal processor calculates the distance to the target by multiplying a speed of light with the time of flight.

In a further embodiment of the present invention, the depth sensor further includes a controller for generating a transmit control signal having reference time points with at least one of substantially same values and/or substantially same phases of the transmit control signal. The light source transmits the source signal to the target according to the transmit control signal. The detector determines the sensed values by measuring the respective portions of the reflected signal during respective time periods with different time delays from the reference time points.

In this manner, the distance to the target is accurately and efficiently measured by determining a time delay corresponding to a maximum or a minimum of the sensed values. The maximum or minimum of the sensed values is indicated at a point when a rate of change varies (i.e., changes direction) from being positive to being negative, or from being negative to being positive.

These and other features and advantages of the present invention will be better understood by considering the following detailed description of the invention which is presented with the attached drawings.

The figures referred to herein are drawn for clarity of illustration and are not necessarily drawn to scale. Elements having the same reference number in FIGS. 1, 2, 3, 4, 5, 6, 7, 8, 9, 10, 11, 12, 13, 14, and 15 refer to elements having similar structure and/or function.

DETAILED DESCRIPTION

Figure 1:
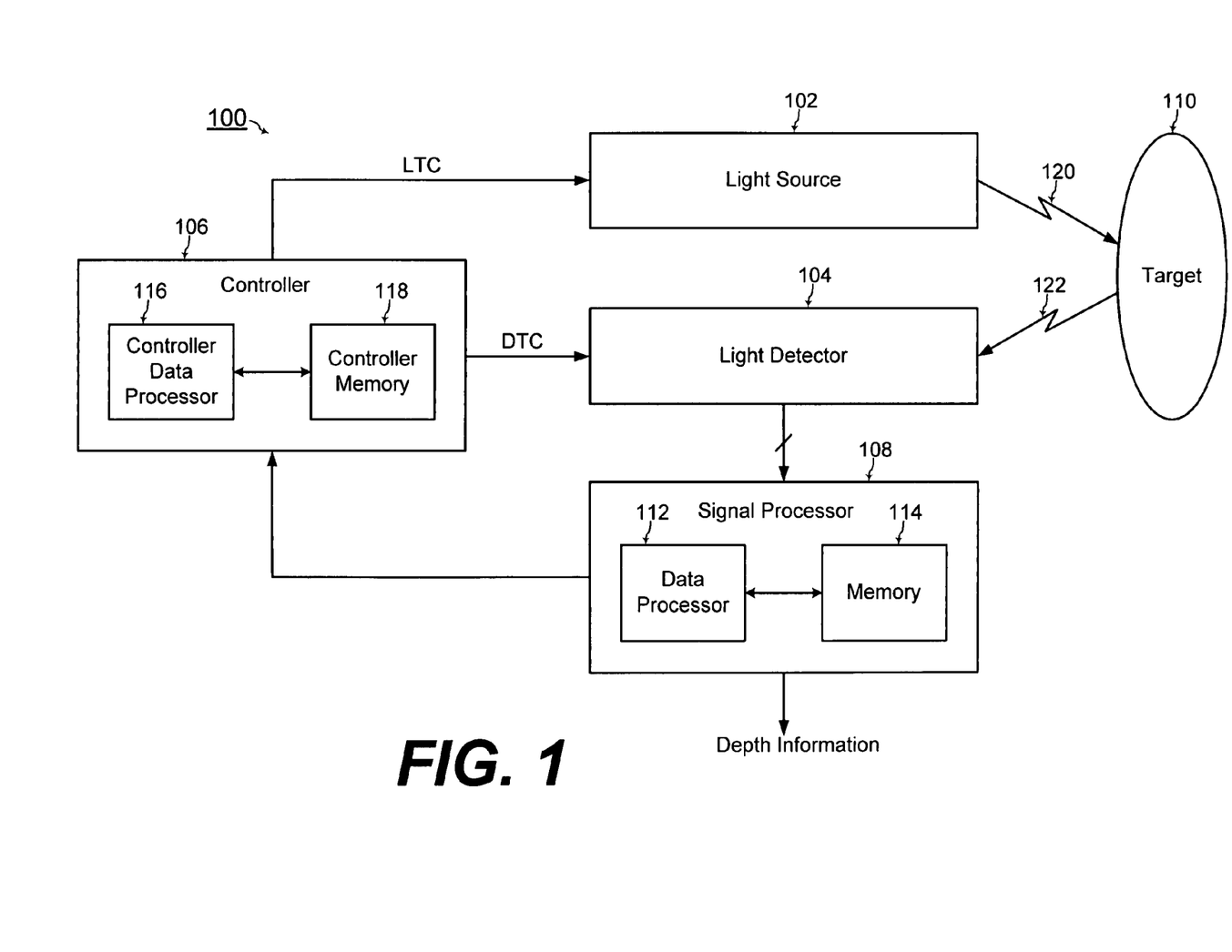
FIG. 1 shows components of a depth sensor according to an example embodiment of the present invention.

FIG. 1 shows a block diagram of a depth sensor 100, according to an example embodiment of the present invention. The depth sensor 100 includes a light source 102, a light detector 104, a controller 106, and a signal processor 108. The depth sensor 100 determines respective distances of points of a target 110 (typically disposed outside of the depth sensor 100) from the depth sensor 100.

The signal processor 108 includes a data processor 112 and a memory device 114 having sequences of instructions (i.e., software and/or firmware) stored thereon. Execution of such sequences of instructions from the memory device 114 by the data processor 112 causes the signal processor 108 to perform functions/steps as described herein with reference to FIGS. 2, 3, 4, 8, and 9.

The controller 106 includes a controller data processor 116 and a controller memory device 118 having sequences of instructions (i.e., software and/or firmware) stored thereon. Execution of such sequences of instructions from the controller memory device 118 by the controller data processor 116 causes the controller 106 to perform functions/steps as described herein with reference to FIGS. 2, 3, 4, 8, and 9.

The light source 102 generates and transmits a source signal 120 such as light for example toward the target 110 according to a transmit control signal LTC from the controller 106. The light detector 104 detects a reflected signal 122 such as the light that is reflected from the target 110 after the light source 102 transmits such light toward the target 110. The light detector 104 detects the reflected signal 122 according to a detect control signal DTC.

Figure 2:
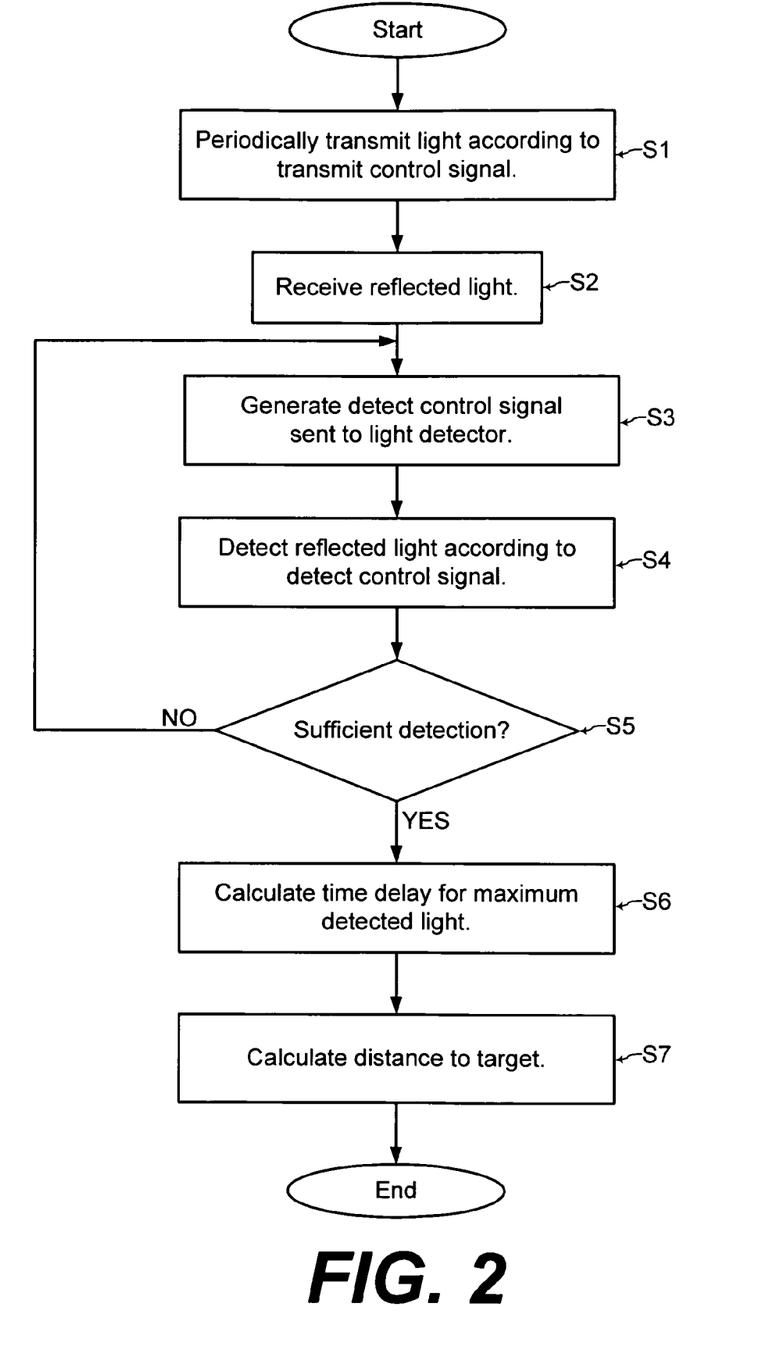
FIG. 2 shows a flow-chart of steps during operation of the depth sensor of FIG. 1, according to an example embodiment of the present invention.
Figure 3:
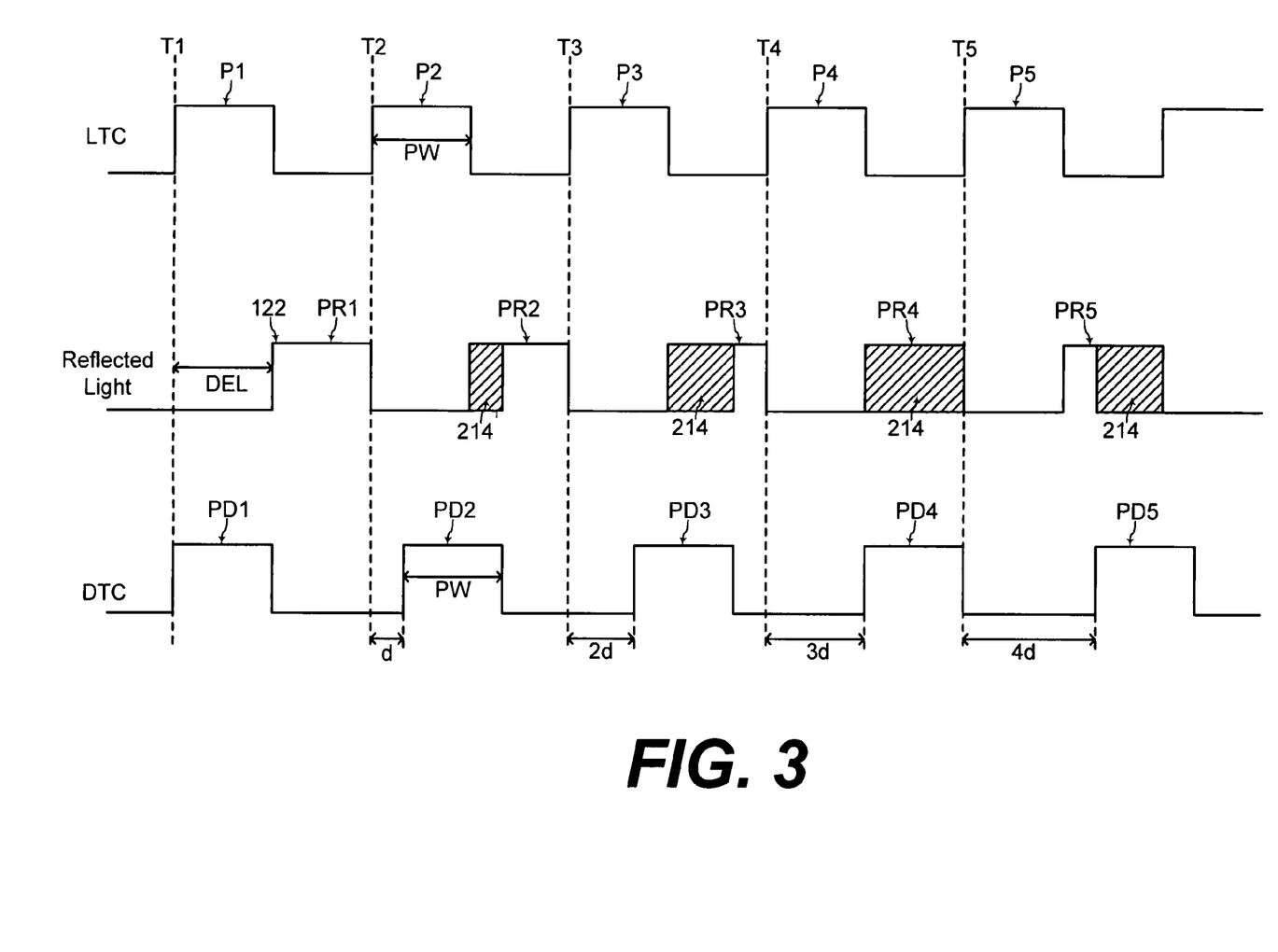
FIG. 3 shows a timing diagram of signals during operation of the depth sensor of FIG. 1, according to an example embodiment of the present invention.

Operation of the depth sensor 100 of FIG. 1 is now described with reference to the flowchart of FIG. 2 and FIGS. 3, 4, and 5. Referring to FIGS. 1, 2, and 3, the controller 106 generates the transmit control signal LTC for controlling operation of the light source 102. In one embodiment of the present invention, the transmit control signal LTC includes a plurality of periodic activated pulses P1, P2, P3, P4, and P5.

The light source 102 periodically transmits light according to the periodic transmit control signal LTC (step S1 of FIG. 2). For example, the light source 102 transmits light during the activated pulses P1, P2, P3, P4, and P5 of the transmit control signal LTC and does not transmit any light when the transmit control signal LTC is not activated outside of the pulses P1, P2, P3, P4, and P5.

In one embodiment of the present invention, the light source 102 continuously transmits a uniform intensity of light during the activated pulses P1, P2, P3, P4, and P5 of the transmit control signal LTC. Alternatively referring to FIG. 13, the light source 102 transmits a series of pulses of light PL during the activated pulses P1, P2, P3, P4, and P5 of the transmit control signal LTC. In another example of FIG. 14, the light source 102 transmits modulated light ML having an intensity that is modulated according to another signal such as a sine wave.

In any case, such light transmitted from the light source 102 is reflected by the target 110 to the light detector 104 that receives such reflected light 122 as a reflected signal (step S2 of FIG. 2). Referring to FIG. 3, the reflected light 122 arrives at the light detector 104 with a transit delay DEL (i.e., a time of flight) with respect to the transmit control signal LTC. The transit delay DEL (i.e., a time of flight) is the time for the light to travel from the light source 102 to the target 110 and from the target 110 to the light detector 104.

The reflected light 122 arrives within reflected pulses of PR1, PR2, PR3, PR4, and PR5 that are similar to the activated pulses P1, P2, P3, P4, and P5, respectively, of the transmit control signal LTC. However, the reflected pulses of PR1, PR2, PR3, PR4, and PR5 of the reflected light 122 are delayed by the transit delay DEL from the activated pulses P1, P2, P3, P4, and P5, respectively, of the transmit control signal LTC.

The controller 106 generates the detect control signal DTC sent to the light detector 104 (step S3 of FIG. 2). The light detector 104 senses the reflected light 122 according to such a detect control signal DTC from the controller 106 (step S4 of FIG. 2). The detect control signal DTC includes a plurality of activated pulses PD1, PD2, PD3, PD4, and PD5. In an example embodiment of the present invention, the pulses P1, P2, P3, P4, and P5 of the transmit control signal LTC and the pulses PD1, PD2, PD3, PD4, and PD5 of the detect control signal DTC each have a same pulse width PW.

In an aspect of the present invention, the activated pulses PD1, PD2, PD3, PD4, and PD5 of the detect control signal DTC have respective delays from reference time points T1, T2, T3, T4, and T5 of the transmit control signal LTC. In one embodiment of the present invention, the reference time points T1, T2, T3, T4, and T5 are at periodic points of the transmit control signal LTC. For example, the reference time points T1, T2, T3, T4, and T5 are at the beginning of the periodic activated pulses P1, P2, P3, P4, and P5 of the transmit control signal LTC. The present invention may be practiced generally with the reference time points being at points of the periodic transmit control signal LTC having at least one of same values and/or same phases.

Further referring to FIG. 3, a first activated pulse PD1 of the delay control signal DTC is delayed from a first reference time point T1 by a respective delay time of zero. A second activated pulse PD2 of the delay control signal DTC is delayed from a second reference time point T2 by a respective delay time of "d". A third activated pulse PD3 of the delay control signal DTC is delayed from a third reference time point T3 by a respective delay time of "2d".

Additionally, a fourth activated pulse PD4 of the delay control signal DTC is delayed from a fourth reference time point T4 by a respective delay time of "3d". A fifth activated pulse PD5 of the delay control signal DTC is delayed from a fifth reference time point T5 by a respective delay time of "4d". In the example of FIG. 3, the activated pulses PD1, PD2, PD3, PD4, and PD5 of the detect control signal DTC have respective delay times that are successively increased by a same increment "d" from the reference time points T1, T2, T3, T4, and T5 of the transmit control signal LTC.

However, the present invention may also be practiced with the activated pulses PD1, PD2, PD3, PD4, and PD5 of the detect control signal DTC having respective delay times that are successively decreased by a same increment "d" from the reference time points T1, T2, T3, T4, and T5, respectively, of the transmit control signal LTC. Alternatively, the present invention may also be practiced with the activated pulses PD1, PD2, PD3, PD4, and PD5 of the detect control signal DTC having respective delay times that are successively increased or decreased by different increments from the reference time points T1, T2, T3, T4, and T5, respectively, of the transmit control signal LTC.

The light detector 104 detects the reflected light 122 from the target 110 according to the detect control signal DTC (step S4 of FIG. 2). The light detector 104 includes a pixel array comprised of a matrix of pixels according to an example embodiment of the present invention. For example, FIG. 5 shows an example 4-transistor unit pixel 150 of the light detector 104 when the depth sensor 100 is formed in a CIS (CMOS image sensor).

However, the present invention may also be practiced with other types of transistor structures of the unit pixels of the light detector 104 such as a 3-transistor structure, a 5-transistor structure, or a photogate structure. In addition, the example unit pixel 150 of the light detector 104 is illustrated for determining a distance to a respective point of the target 110. The light detector 104 includes a plurality of unit pixels, each used for determining a respective distance to a respective point of the target. The present invention is described for the example unit pixel 150 for simplicity and clarity of description and illustration.

Figure 5:
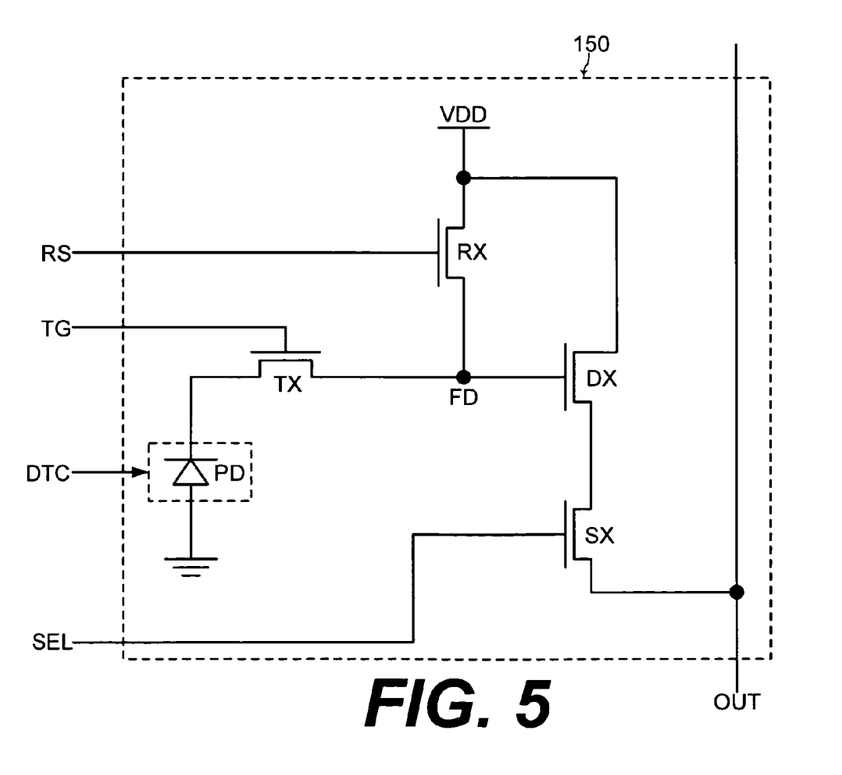
FIG. 5 shows a circuit diagram of a pixel in a detector of FIG. 1, according to an example embodiment of the present invention.
Figure 6:
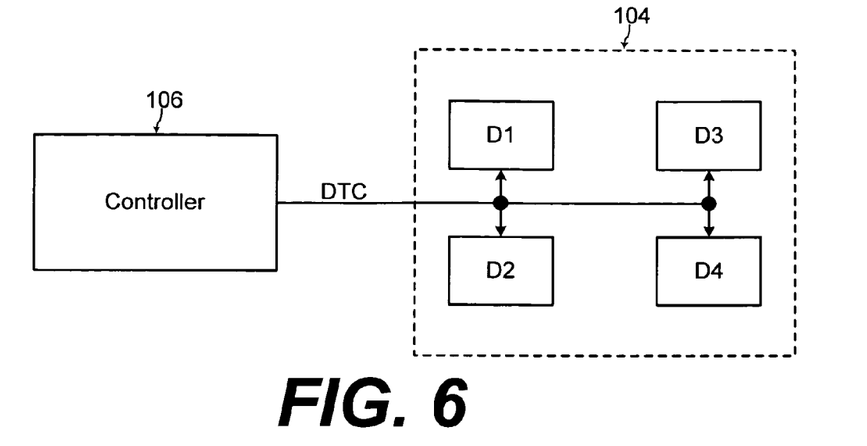
FIG. 6 shows an example configuration of the detector and a controller of FIG. 1, according to an example embodiment of the present invention.

The unit pixel 150 of FIG. 5 includes a photo sensitive device such as a photodiode PD for accumulating an amount of charge depending on an intensity of light reaching the photodiode PD. A transfer transistor TX is coupled between the photodiode PD and a floating diffusion node FD. A reset transistor RX is coupled between a power source VDD and the floating diffusion node FD. A drive transistor is coupled between the power source VDD and the floating diffusion node FD. A select transistor is coupled between the drive transistor DX and an output node generating an output signal OUT that indicates a plurality of sensed values.

A transfer control signal TG (applied at a gate of the transfer transistor TX) controls the transfer transistor TX to transfer the charge accumulated at the photodiode PD to the floating diffusion node FD. A reset control signal RS (applied at a gate of the reset transistor RX) controls the reset transistor RX to reset the voltage at the floating diffusion node FD to a reset voltage VDD. A select control signal SEL (applied at a gate of the select transistor SX) controls the select transistor SX to turn on for coupling the drive transistor DX to the output node when the unit pixel 150 is selected for operation.

The detect control signal DTC is applied to the photodiode PD and controls the photodiode PD to accumulate charge in response to the received light 122 when the detect control signal DTC is activated. For example referring to FIGS. 3 and 5, the photodiode PD is controlled by the detect control signal DTC to accumulate charge in response to the received light 122 during the activated pulses PD1, PD2, PD3, PD4, and PD5 of the detect control signal DTC. In that case, the photodiode PD is inactivated and does not respond to any light reaching the photodiode PD when the detect control signal DTC is inactivated outside of the activated pulses PD1, PD2, PD3, PD4, and PD5.

Referring to FIGS. 1, 3, and 5, a respective portion of light reaching the photodiode PD is sensed by the photodiode PD during each of the activated pulses PD1, PD2, PD3, PD4, and PD5 of the detect control signal DTC. In the example of FIG. 3, no portion of the light reaching the photodiode PD during a first reflected pulse PR1 is sensed by the photodiode PD since the first reflected pulse PR1 does not overlap with the first activated period PD1 of the delay control signal DTC.

Figure 4:
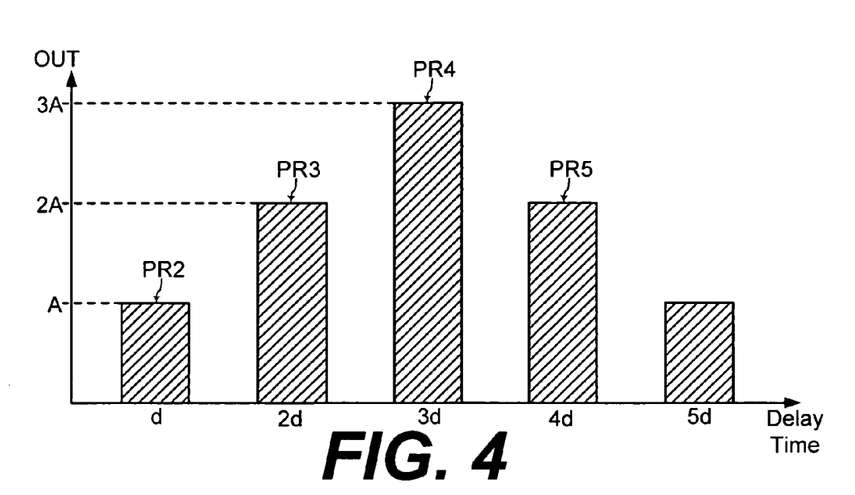
FIG. 4 shows a plurality of sensed values measured by a signal processor of FIG. 1, according to an example embodiment of the present invention.

A second reflected pulse PR2 of light overlaps with the second activated period PD2 of the delay control signal DTC during a respective overlap portion 162 (shown shaded in FIG. 3). Light reaching the photodiode PD during such a respective overlap portion 162 is sensed by the photodiode PD. Referring to FIGS. 3 and 4, a respective amount "A" of charge accumulated by the photodiode PD during the respective overlap portion 162 is proportional to the length of time of the respective overlap portion 162.

A third reflected pulse PR3 of light overlaps with the third activated period PD3 of the delay control signal DTC during a respective overlap portion 164 (shown shaded in FIG. 3). Light reaching the photodiode PD during such a respective overlap portion 164 is sensed by the photodiode PD. Referring to FIGS. 3 and 4, a respective amount "2A" of charge accumulated by the photodiode PD during the respective overlap portion 164 is proportional to the length of time of the respective overlap portion 164.

A fourth reflected pulse PR4 of light overlaps with the fourth activated period PD4 of the delay control signal DTC during a respective overlap portion 166 (shown shaded in FIG. 3). Light reaching the photodiode PD during such a respective overlap portion 166 is sensed by the photodiode PD. Referring to FIGS. 3 and 4, a respective amount "3A" of charge accumulated by the photodiode PD during the respective overlap portion 166 is proportional to the length of time of the respective overlap portion 166.

A fifth reflected pulse PR5 of light overlaps with the fifth activated period PD5 of the delay control signal DTC during a respective overlap portion 168 (shown shaded in FIG. 3). Light reaching the photodiode PD during such a respective overlap portion 168 is sensed by the photodiode PD. Referring to FIGS. 3 and 4, a respective amount "2A" of charge accumulated by the photodiode PD during the respective overlap portion 168 is proportional to the length of time of the respective overlap portion 168.

FIG. 4 shows a plot of the output signal OUT generating a plurality of sensed values by the pixel 150 for each of the reflected pulses PR2, PR2, PR3, PR4, and PR5 that have respective overlap portions with respective time delays d, 2d, 3d, and 4d of the activated pulses PD2, PD3, PD4, and PD5 of the delay control signal DTC. The respective amount of charge accumulated by the photodiode PD during respective overlap portions 162, 164, and 166 is successively increased by a same increment to result in a corresponding successive increase of the sensed values (A, 2A, and 3A) by a same increment "A" in the example of FIG. 4.

Thereafter, the respective amount of charge accumulated by the photodiode PD during respective overlap portions 166 and 168 is successively decreased by a same increment to result in a corresponding successive decrease of the sensed values (3A, 2A, and A) by a same increment "A". Thus, the respective delay time 3d corresponding to a maximum 3A of the sensed values of the output signal OUT is determined. Such a respective delay time 3d is closest to the transit delay DEL (i.e., time of flight) of the reflected light signal 122 with respective to the source light signal 120.

Referring to FIGS. 1 and 2, the signal processor 108 determines whether such a maximum of the sensed values of the output signal OUT is sufficiently detected (step S5 of FIG. 2). For example, the signal processor 108 determines that the maximum of the sensed values of the output signal OUT is sufficiently detected after the activated pulses of the delay control signal DTC have been successively delayed to at least a predetermined delay time.

Alternatively, the signal processor 108 determines that the maximum of the sensed values of the output signal OUT is sufficiently detected when a rate of change of the sensed values varies (i.e., changes direction) from being positive (for successively increasing sensed values) to being negative (for successively decreasing sensed values). The present invention may also be practiced with a minimum of the sensed values of the output signal OUT being sufficiently detected when the rate of change of the sensed values varies from being negative (for successively decreasing sensed values) to being positive (for successively increasing sensed values).

If the signal processor 108 determines that the maximum/minimum of the sensed values of the output signal OUT is not sufficiently detected (step S5 of FIG. 2), the controller 106 continues to control the light detector 104 to detect the reflected light 122 according to the active pulses of the detect control signal DTC with successively increased or decreased time delays from the reference time points of the transmit control signal LTC (steps S3 and S4 of FIG. 2). The signal processor 108 controls the light detector 104 to generate sensed values of the output signal OUT in this manner until the maximum/minimum of the sensed values of the output signal OUT is sufficiently detected (step S5 of FIG. 5).

Once the maximum/minimum of the sensed values of the output signal OUT is determined (step S5 of FIG. 5), the signal processor 108 determines the respective time delay resulting in such a maximum/minimum of the sensed values OUT (step S6 of FIG. 2). In the example of FIGS. 3 and 4, the respective time delay of 3d results in the maximum sensed value of 3A with the greatest overlap area 166 of the reflected pulse PR4 of light with the activated pulse PD4 of the detect control signal DTC.

The signal processor 108 then determines the respective distance to a point of the target 110 from the pixel 150 of the depth sensor 100 by multiplying the respective time delay for the maximum/minimum of the sensed values OUT with the speed of light "c" (step S7 of FIG. 2). In the example of FIGS. 3 and 4, the distance to the target 110 from the pixel 150 is expressed as follows:

distance=3$d^*c$.

In this manner, the distance to the target 110 from the depth sensor 100 (i.e., depth information) is accurately and efficiently determined by controlling the delay of the activated pulses PD1, PD2, PD3, PD4, and PD5 of the detect control signal DTC. In addition, the distance to the target 110 is accurately and efficiently measured by determining the respective time delay corresponding to a maximum/minimum of the sensed values. The maximum/minimum of the sensed values is indicated at a point when a rate of change varies from being positive to being negative, or from being negative to being positive.

The foregoing is by way of example only and is not intended to be limiting. For example referring to FIG. 6, the present invention may be practiced with the detect control signal DTC being applied on multiple pixels D1, D2, D3, and D4 of the light detector 104 according to one embodiment of the present invention. In that case, the charge accumulated in such multiple pixels D1, D2, D3, and D4 may be summed for generating sensed values with high amplitudes for increased sensitivity. In one embodiment of the present invention, the multiple pixels D1, D2, D3, and D4 are disposed in a same row in the pixel array forming the light detector of FIG. 6.

Figure 7:
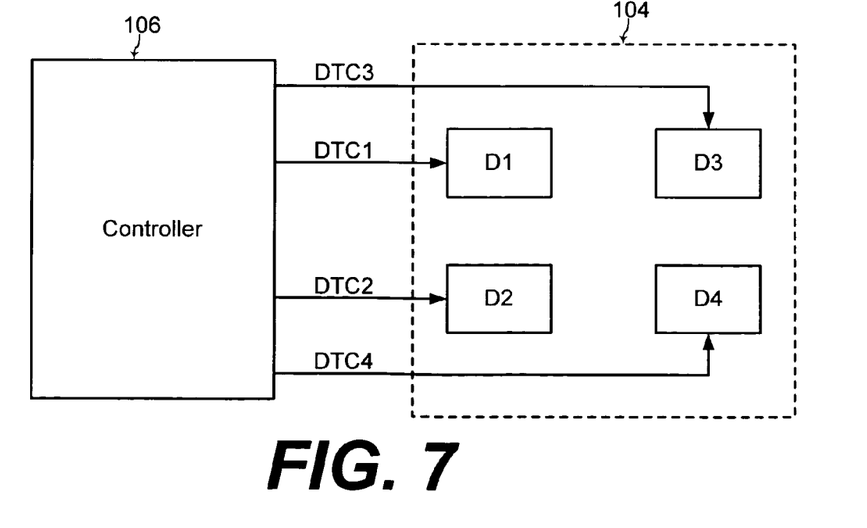
FIG. 7 shows an example configuration of the detector and the controller of FIG. 1, according to another example embodiment of the present invention.

Alternatively referring to FIG. 7, different respective detect control signals DTC1, DTC2, DTC3, and DTC4 are applied on the multiple pixels D1, D2, D3, and D4, respectively. In one embodiment of the present invention, the detect control signals DTC1, DTC2, DTC3, and DTC4 are successively phase-shifted, such as 90° for example, from each-other, and the pixels D1, D2, D3, and D4 are disposed in different rows in the pixel array forming the light detector of FIG. 7.

Figure 8:
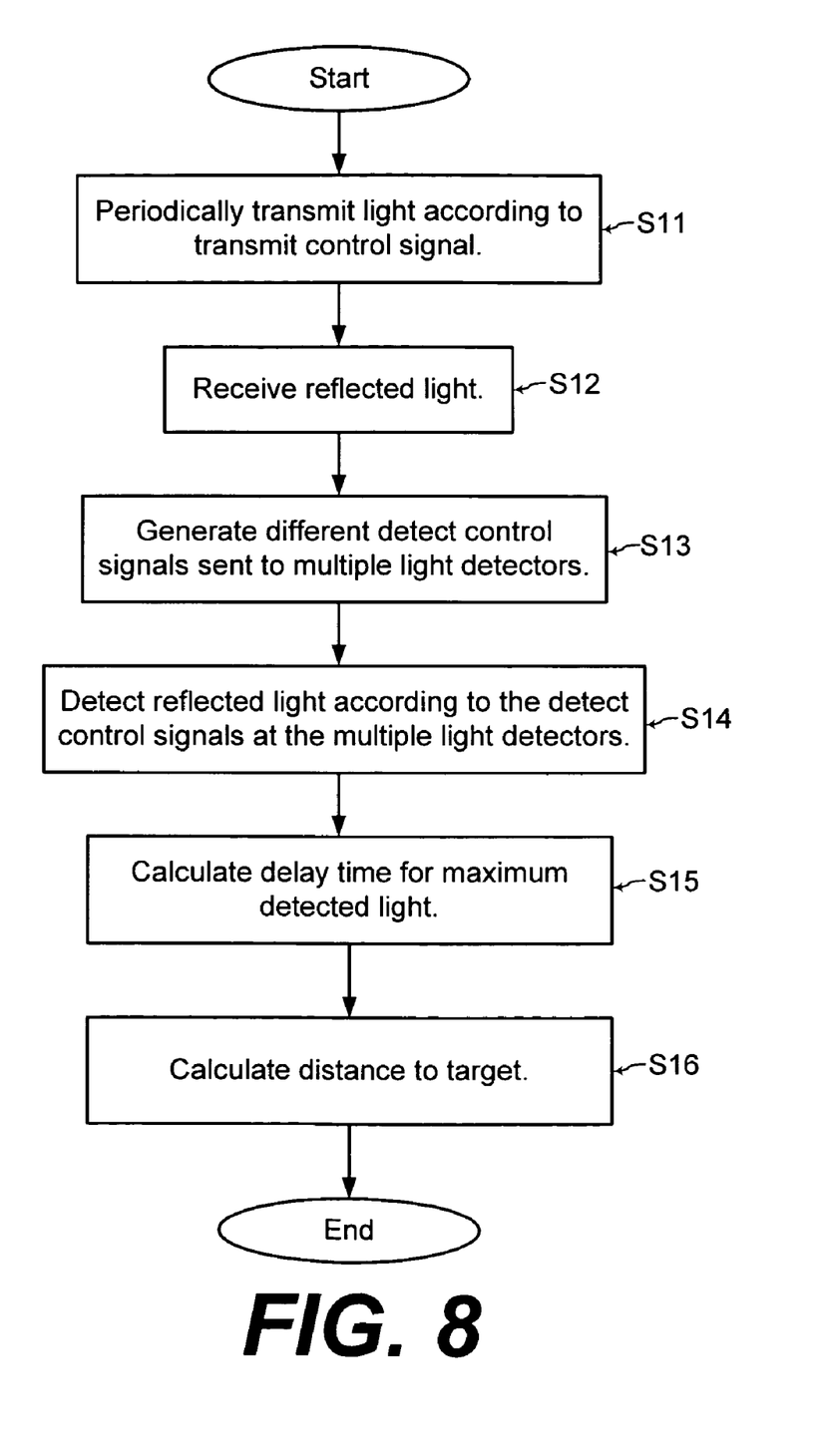
FIG. 8 shows a flow-chart of steps during operation of the depth sensor of FIGS. 1 and 7, according to another example embodiment of the present invention.

FIG. 8 shows a flowchart of steps during operation of the depth sensor 100 of FIGS. 1 and 7 with the multiple detect control signals DTC1, DTC2, DTC3, and DTC4 that are successively phase-shifted from each-other. Referring to FIGS. 1, 7, and 8, the controller 106 controls the light source to transmit a source signal such as light toward the target 110 according to the periodic transmit control signal LTC (step S11 of FIG. 8). Such transmitted light is received and reflected by the target 110 as the reflected signal (step S12 of FIG. 8).

Further referring to FIG. 8, the controller 106 generates the multiple different detect control signals DTC1, DTC2, DTC3, and DTC4 that are successively phase-shifted from each-other to the multiple pixels D1, D2, D3, and D4, respectively, (step S13 of FIG. 8). The multiple pixels D1, D2, D3, and D4 accumulate respective charge according to the respective detect control signals DTC1, DTC2, DTC3, and DTC4 to generate respective sensed values (step S14 of FIG. 8).

The signal processor 108 processes the respective sensed values from the multiple pixels D1, D2, D3, and D4 to determine the respective delay time (i.e., the phase of one of the detect control signals DTC1, DTC2, DTC3, and DTC4) corresponding to a maximum/minimum of the sensed values from the multiple pixels D1, D2, D3, and D4 (step S15 of FIG. 8). The signal processor 108 then determines the distance to the target 110 from the depth sensor 100 by multiplying such a delay time with the speed of light "c" (step S16 of FIG. 8). In this manner in the embodiment of FIG. 8, the distance to the target 110 from the depth sensor 100 is accurately and efficiently determined by controlling the phases of the multiple detect control signals DTC1, DTC2, DTC3, and DTC4 to the multiple pixels D1, D2, D3, and D4.

Figure 9:
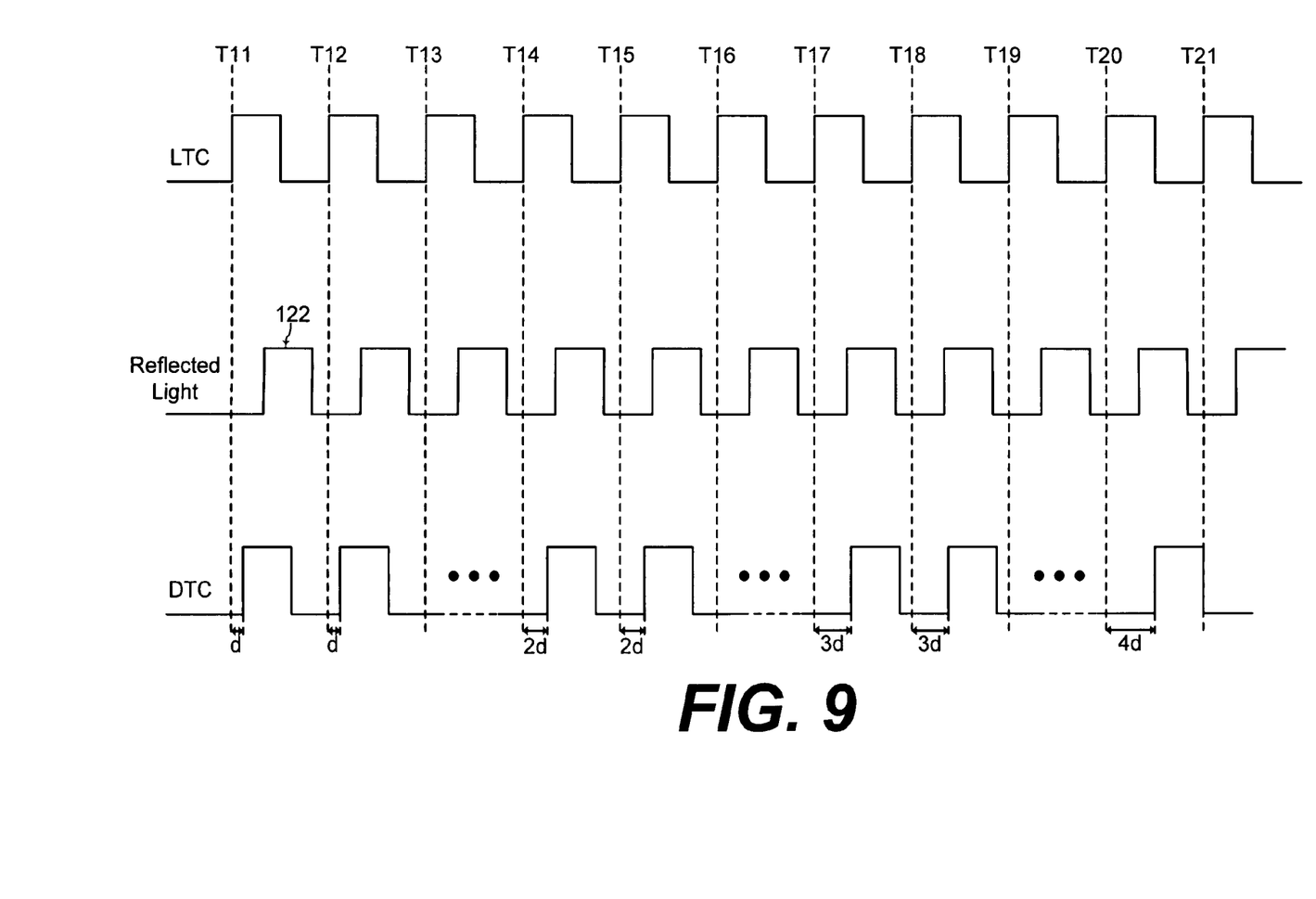
FIG. 9 shows a timing diagram of signals during operation of the depth sensor of FIG. 1, according to another example embodiment of the present invention.

FIG. 9 shows a timing diagram of signals during operation of the depth sensor of FIG. 1, according to another example embodiment of the present invention. FIG. 9 shows the periodic transmit control signal LTC and the reflected light signal, similar to FIG. 3. However in FIG. 9, the detect control signal DTC has multiple activated pulses for each of the delay times d, 2d, 3d, and 4d.

In that case, respective multiple sensed values are generated for the multiple activated pulses corresponding to each of the delay times d, 2d, 3d, and 4d. The signal processor 108 accumulates such multiple sensed values to generate stronger respective sensed values for each of the delay times d, 2d, 3d, and 4d. Alternatively, the signal processor 108 averages such multiple sensed values to generate respective mean sensed values for the delay times d, 2d, 3d, and 4d with enhanced noise immunity. In any case, the present invention is then practiced with the signal processor 108 determining a maximum/minimum of such mean values or such accumulated values that are gradually increasing or decreasing by a same increment with time or by different increments with time.

Figure 10:
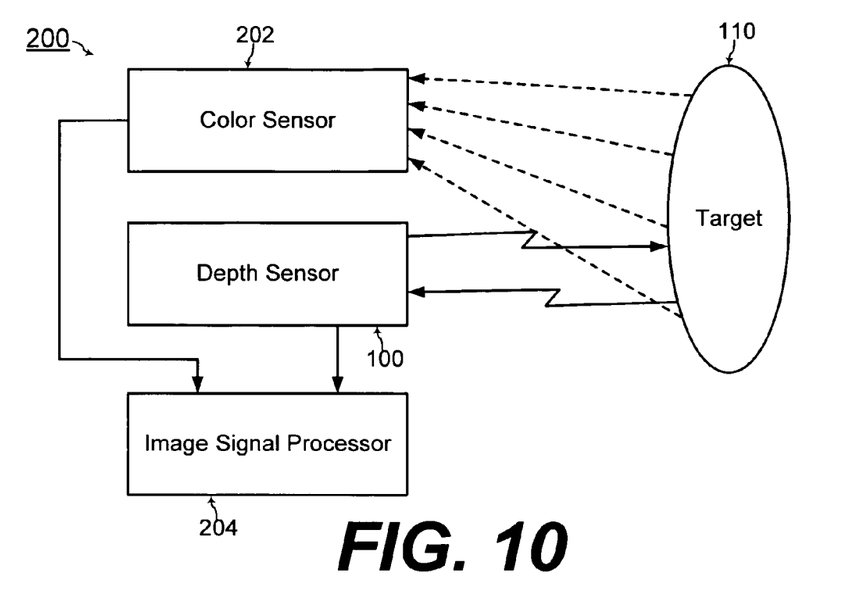
FIG. 10 shows a block diagram of an image sensor with a color sensor and a depth sensor formed on two separate integrated circuit chips, according to an example embodiment of the present invention.

FIG. 10 shows a block diagram of an image sensor 200 having the depth sensor 100 of FIG. 1 for generating depth information of the target 110 for an image signal processor 204. The image sensor 200 also includes a color sensor 202 for generating color information of the target 110 for the image signal processor 204. In the embodiment of FIG. 10, the color sensor 202 and the depth sensor 100 are formed as two separate integrated circuit chips.

Figure 11:
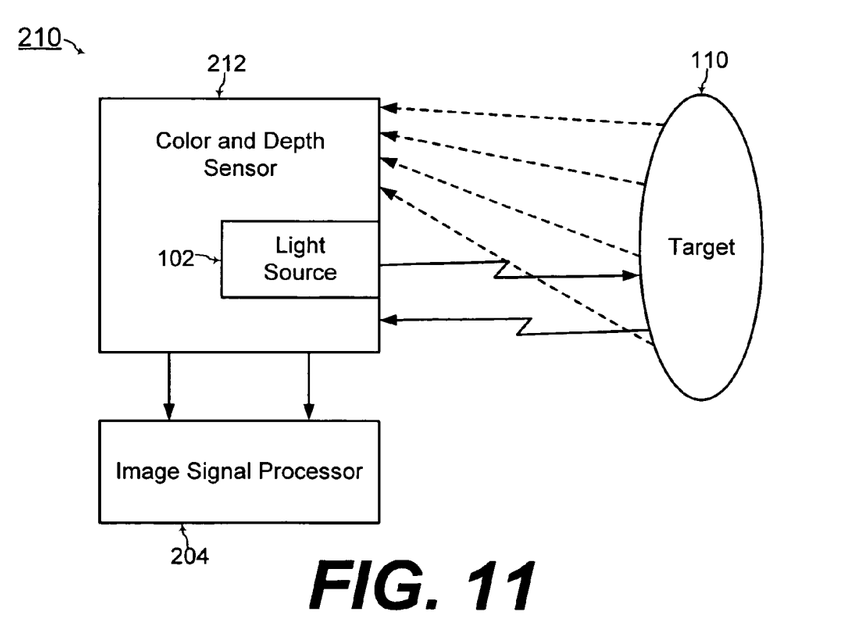
FIG. 11 shows a block diagram of an image sensor with a color sensor and a depth sensor formed on one integrated circuit chip, according to an example embodiment of the present invention.

In contrast, FIG. 11 shows a block diagram of an image sensor 210 having the components of the depth sensor 100 of FIG. 1 incorporated into a color and depth sensor 212 formed as one integrated circuit chip, according to an alternative embodiment of the present invention. In that case, the color and depth sensor 212 generates depth and color information for the target 110 to be processed by the image signal processor 204.

Figure 12:
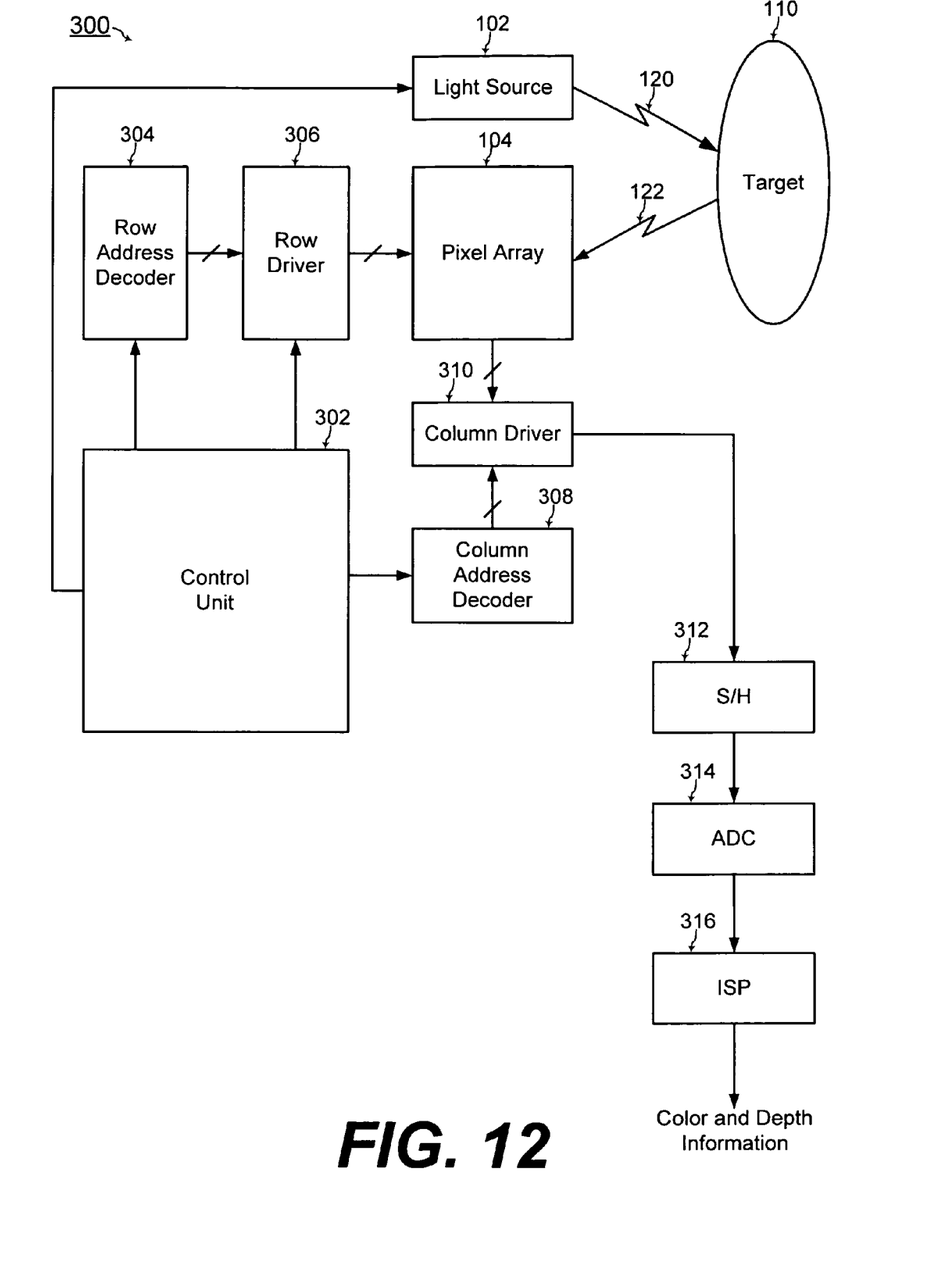
FIG. 12 shows a block diagram of an image sensor having a color sensor and a depth sensor formed with a pixel array, according to an example embodiment of the present invention.

FIG. 12 shows a block diagram of an image sensor 300 including components of the depth sensor of FIG. 1, according to another embodiment of the present invention. The image sensor 300 includes the light source 102, and the light detector 104 is implemented as a pixel array of the image sensor 300. The controller 106 of FIG. 1 is implemented as a control unit 302, a row address decoder 304, a row driver 306, a column address decoder 308, and a column driver 310. The control unit 302 generate the transmit control signal LTC similarly as described herein with respect to FIG. 1. The control unit 302, the row address decoder 304, the row driver 306, the column address decoder 308, and the column driver 310 operate together to provide the effect of the detect control signal DTC for controlling the pixels of the pixel array 104 similarly as described herein with respect to FIG. 1.

Furthermore, the signal processor 108 of FIG. 1 is implemented as a sample and hold (S/H) unit 312, an analog to digital converter (ADC) 314, and an image signal processor 316. Such components 312, 314, and 316 receive the sensed values generated as output signals OUT from the pixel array to determine the respective delay time corresponding to a maximum/minimum of sensed values to generate depth information for the target 110, similarly as described in reference to FIG. 1.

The components 302, 304, 306, 308, 310, 312, 314, and 316 of the image sensor 300 also perform typical functions for also generating color information of the target 110. Such functions of the components 302, 304, 306, 308, 310, 312, 314, and 316 for generating color information of the target 110 are known to one of ordinary skill in the art of image sensors.

Figure 13:
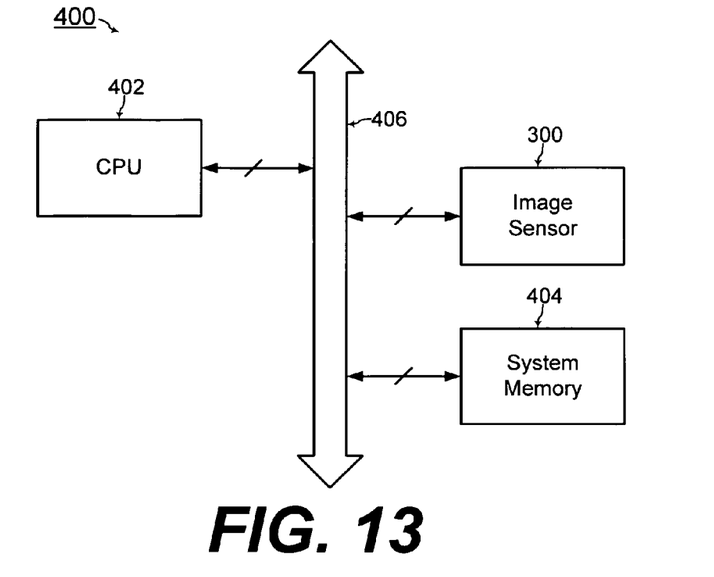
FIG. 13 shows a block diagram of an electronic system including the image sensor of FIG. 12, according to an example embodiment of the present invention.
Figure 14:
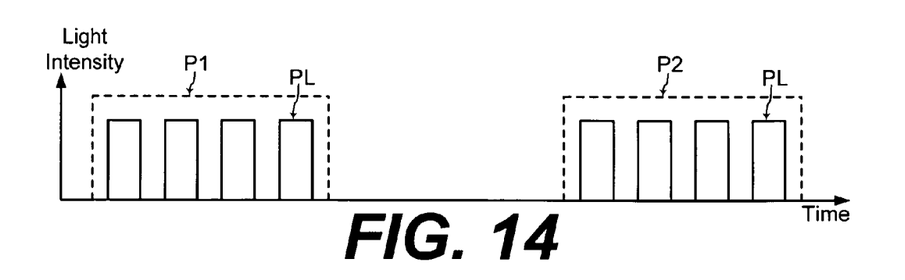
FIG. 14 shows light pulses generated by a light source of FIG. 1 according to a transmit control signal, according to an example embodiment of the present invention.
Figure 15:
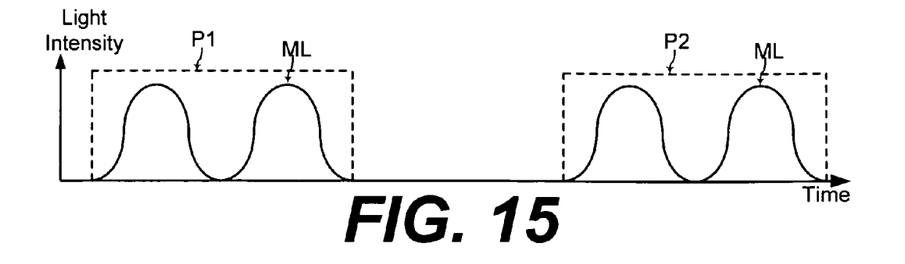
FIG. 15 shows modulated light generated by the light source of FIG. 1 according to the transmit control signal, according to another example embodiment of the present invention.

FIG. 13 shows an electronic system 400 including the image sensor 300 of FIG. 12. The electronic system also includes a CPU (central processing unit) 402 and a system memory device 404 coupled to the image sensor 300 via a system bus 406. The image sensor 300 including components and/or functionality of the depth sensor 100 of FIG. 1 may be advantageously incorporated into the electronic system 400 with a camera for example.

The foregoing is by way of example only and is not intended to be limiting. For example, any number of elements as illustrated and described herein is by way of example only. The present invention is limited only as defined in the following claims and equivalents thereof.

The invention claimed is:

1. A method for measuring a distance from a target, comprising:
   transmitting a source signal to the target according to a transmit control signal having reference time points;
   receiving a reflected signal from the source signal being reflected from the target;
   generating a plurality of sensed values by measuring respective portions of the reflected signal during respective time periods with different time delays from said reference time points; and
   determining a respective delay time for when a rate of change of the sensed values changes in direction with the respective delay time indicating said distance of the target.

2. The method of claim 1, wherein the reference time points have at least one of substantially same values and substantially same phases of the transmit control signal.

3. The method of claim 1, further comprising:
   determining said distance of the target by multiplying a speed of light with said respective delay time.

4. The method of claim 1, wherein the reference time points are at periodic points of the transmit control signal.

5. The method of claim 4, wherein the transmit control signal includes a series of pulses indicating turn on and turn off of a light source for generating the source signal.

6. The method of claim 5, wherein the light source generates pulses of light or modulated light when turned on by the transmit control signal.

7. The method of claim 1, wherein said different time delays from the respective reference time points are gradually increased or decreased by a same increment with time or by different increments with time.

8. The method of claim 1, wherein a mean value or accumulated value of said sensed values is gradually increased or decreased by a same increment with time or by different increments with time.

9. A method for measuring a distance from a target, comprising:
   transmitting a source signal to the target;
   receiving a reflected signal from the source signal being reflected from the target;
   generating a plurality of sensed values by measuring respective portions of the reflected signal; and
   determining the distance from the target according to when a rate of change of the sensed values changes in direction to determine a time of flight that indicates the distance from the target.

10. The method of claim 9, further comprising:
    determining the time of flight corresponding to a maximum or a minimum of the sensed values; and
    calculating said distance by multiplying a speed of light with the time of flight.

11. The method of claim 9, further comprising:
    transmitting the source signal to the target according to a transmit control signal having reference time points with at least one of substantially same values and/or substantially same phases of the transmit control signal; and
    generating the sensed values by measuring the respective portions of the reflected signal during respective time periods with different time delays from said reference time points.

12. A depth sensor comprising:
a light source for transmitting a source signal to the target according to a transmit control signal having reference time points;
a detector for receiving a reflected signal from the source signal being reflected from the target; and
a signal processor for generating a plurality of sensed values by measuring respective portions of the reflected signal during respective time periods with different time delays from said reference time points wherein the signal processor determines a respective delay time for when a rate of change of the sensed values changes in direction with the respective delay time indicating said distance of the target.

13. The depth sensor of claim 12, further comprising:
a controller for generating the control signal with the reference time points having at least one of substantially same values and substantially same phases of the transmit control signal.

14. The depth sensor of claim 12, wherein the signal processor determines said distance of the target by multiplying a speed of light with said respective delay time.

15. The depth sensor of claim 12, wherein the reference time points are at periodic points of the transmit control signal.

16. The depth sensor of claim 15, wherein the transmit control signal includes a series of pulses indicating turn on and turn off of said light source for generating the source signal.

17. The depth sensor of claim 16, wherein the light source generates pulses of light or modulated light when turned on by the transmit control signal.

18. The depth sensor of claim 12, wherein said different time delays from the respective reference time points are gradually increased or decreased by a same increment with time or by different increments with time.

19. The depth sensor of claim 12, wherein a mean value or accumulated value of said sensed values is gradually increased or decreased by a same increment with time or by different increments with time.

20. A depth sensor comprising:
a light source for transmitting a source signal to the target;
a detector for receiving a reflected signal from the source signal being reflected from the target; and
a signal processor for generating a plurality of sensed values by measuring respective portions of the reflected signal, and for determining the distance from the target according to when a rate of change of the sensed values changes in direction to determine a time of flight that indicates the distance from the target.

21. The depth sensor of claim 20, wherein the signal processor determines the time of flight corresponding to a maximum or a minimum of the sensed values, and wherein the signal processor calculates said distance by multiplying a speed of light with the time of flight.

22. The depth sensor of claim 20, further comprising:
a controller for generating a transmit control signal having reference time points with at least one of substantially same values and/or substantially same phases of the transmit control signal;
wherein the light source transmits the source signal to the target according to the transmit control signal; and
wherein the detector determines the sensed values by measuring the respective portions of the reflected signal during respective time periods with different time delays from said reference time points.

* * * * *